US012781035B2

(12) United States Patent
Hosoe et al.

(10) Patent No.: US 12,781,035 B2
(45) Date of Patent: Nov. 3, 2026

(54) WATER DISPERSION OF VINYL HALIDE COPOLYMER AND FILM

(71) Applicant: ASAHI KASEI KABUSHIKI KAISHA, Tokyo (JP)

(72) Inventors: Natsuki Hosoe, Tokyo (JP); Naoaki Yamasaki, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 611 days.

(21) Appl. No.: 17/906,864

(22) PCT Filed: Mar. 10, 2021

(86) PCT No.: PCT/JP2021/009588
§ 371 (c)(1),
(2) Date: Sep. 21, 2022

(87) PCT Pub. No.: WO2021/193067
PCT Pub. Date: Sep. 30, 2021

(65) Prior Publication Data

US 2023/0174762 A1 Jun. 8, 2023

(30) Foreign Application Priority Data

Mar. 27, 2020 (JP) ................................ 2020-059059

(51) Int. Cl.
*C08L 27/08* (2006.01)
*C08F 214/08* (2006.01)
*C09D 127/08* (2006.01)

(52) U.S. Cl.
CPC ............ *C08L 27/08* (2013.01); *C08F 214/08* (2013.01); *C09D 127/08* (2013.01); *C08L 2201/14* (2013.01); *C08L 2201/54* (2013.01); *C08L 2203/16* (2013.01); *C08L 2205/24* (2013.01)

(58) Field of Classification Search
None
See application file for complete search history.

(56) References Cited

U.S. PATENT DOCUMENTS

| | | | | |
|---|---|---|---|---|
| 4,168,372 | A * | 9/1979 | Meier | C08F 259/04 526/318.4 |
| 4,535,120 | A | 8/1985 | Hiyoshi et al. | |
| 4,694,068 | A | 9/1987 | DeLassus et al. | |
| 4,795,665 | A | 1/1989 | Lancaster et al. | |
| 2004/0167267 | A1 | 8/2004 | Vanderveken et al. | |
| 2010/0279110 | A1 | 11/2010 | Kuwata et al. | |
| 2011/0023945 | A1 | 2/2011 | Hayashi et al. | |
| 2012/0244297 | A1* | 9/2012 | Kitaguchi | C08F 220/325 526/204 |
| 2015/0044489 | A1* | 2/2015 | Kameyama | C09D 127/08 428/522 |

FOREIGN PATENT DOCUMENTS

| | | | | |
|---|---|---|---|---|
| CA | 2074034 | A1 | 1/1993 | |
| EP | 2216173 | A1 * | 8/2010 | C08L 27/08 |
| EP | 2818485 | A1 | 12/2014 | |
| GB | 1519548 | A | 8/1978 | |
| JP | S5776044 | A | 5/1982 | |
| JP | S60192629 | A | 10/1985 | |
| JP | S60192768 | A | 10/1985 | |
| JP | S60250041 | A | 12/1985 | |
| JP | H05202107 | A | 8/1993 | |
| JP | H09296014 | A | 11/1997 | |
| JP | H10158455 | A | 6/1998 | |
| JP | H1135763 | A | 2/1999 | |
| JP | H11170450 | A | 6/1999 | |
| JP | 2000248493 | A | 9/2000 | |
| JP | 2000302821 | A | 10/2000 | |
| JP | 2001342317 | A | 12/2001 | |
| JP | 2001526315 | A | 12/2001 | |
| JP | 2018127523 | A * | 8/2018 | |
| JP | 2020146909 | A | 9/2020 | |
| WO | 2009069307 | A1 | 6/2009 | |
| WO | 2013125699 | A1 | 8/2013 | |
| WO | 2021122903 | A1 | 6/2021 | |

OTHER PUBLICATIONS

JP2018127523 English machine translation, prepared Sep. 29, 2025. (Year: 2025).*

Aug. 14, 2023, the Supplementary European Search Report issued by the European Patent Office in the corresponding European Patent Application No. 21776827.4.

Sep. 22, 2022, International Preliminary Report on Patentability issued in the International Patent Application No. PCT/JP2021/009588.

(Continued)

*Primary Examiner* — Christopher M Rodd

(74) *Attorney, Agent, or Firm* — KENJA IP LAW PC

(57) ABSTRACT

Provided is a water dispersion of a vinyl halide copolymer having favorable film formation property after long-term storage while maintaining high water vapor barrier property of a film after coating. A water dispersion of a vinyl halide copolymer comprises a vinyl halide copolymer containing a structural unit derived from a vinyl halide monomer and a structural unit derived from a copolymerization monomer whose reactivity ratio r1 is less than 0.7, wherein a mass ratio of the structural unit derived from the copolymerization monomer is 1 part by mass or more with respect to 100 parts by mass in total of the structural unit derived from the vinyl halide monomer, the structural unit derived from the copolymerization monomer, and a structural unit derived from a copolymerization monomer whose reactivity ratio r1 is 0.7 or more, and S1/(S1+S2) is 0 or more and 0.33 or less.

9 Claims, 4 Drawing Sheets

(56) References Cited

OTHER PUBLICATIONS

May 25, 2021, International Search Report issued in the International Patent Application No. PCT/JP2021/009588.

* cited by examiner

WATER DISPERSION OF VINYL HALIDE COPOLYMER AND FILM

TECHNICAL FIELD

The present disclosure relates to a water dispersion of a vinyl halide copolymer, and a film having a layer formed by coating the water dispersion.

BACKGROUND

For quality preservation of food and pharmaceutical products, packaging films for such products need to enclose the products by sufficiently blocking gases such as oxygen, nitrogen, carbon dioxide, and water vapor in the atmosphere. In this regard, among various resins, a film having a layer formed from a vinyl halide-based copolymer water dispersion, particularly a vinylidene chloride-based copolymer water dispersion resin, has excellent barrier property against water vapor and oxygen, and therefore is very suitable for food and pharmaceutical packaging.

In recent years, packaging films are required to have higher gas barrier property for the following reasons:

1) preservation of food material quality and preservation of drug efficacy for longer periods;
2) film thickness reduction to meet the demand to improve the ease of pushing out the contents of packaged products in view of the aging population; and
3) film thickness reduction for improvement in productivity.

As vinylidene chloride-based water dispersions for forming films having barrier property, the water dispersions disclosed in PTL 1 to PTL 5 are known.

CITATION LIST

Patent Literature

PTL 1: pamphlet of WO 2013/125699 A1
PTL 2: JP 2001-526315 A
PTL 3: JP H05-202107 A
PTL 4: JP 2018-127523 A
PTL 5: JP S60-192768 A

SUMMARY

Technical Problem

For the vinyl halide copolymers described in PTL 1 to PTL 3, further improvement in water vapor barrier property is difficult due to their monomer combinations.

The copolymers described in PTL 4 and PTL 5, i.e. the copolymers obtained by copolymerizing comonomers whose reactivity ratio r1 to vinylidene chloride is less than 0.7, have high water vapor barrier property. However, such copolymers are easy to crystallize, and crystallization progresses even in a water dispersion state. Hence, the film formation property worsens over time in long-term storage.

Thus, with the water dispersions described in PTL 1 to PTL 5, it is difficult to achieve both the film formation property after long-term storage and high barrier property of a film having a layer formed from the water dispersion.

It could therefore be helpful to provide a water dispersion of a vinyl halide copolymer having favorable film formation property after long-term storage while maintaining high water vapor barrier property of a film after coating.

Solution to Problem

As a result of repeatedly conducting intensive study, it was discovered that a water dispersion containing a vinyl halide copolymer of a specific composition and having a specific melting peak temperature ratio has excellent film formation property after long-term storage while maintaining high water vapor barrier property of a film after coating. The present disclosure is based on this discovery.

We thus provide:

[1] A water dispersion of a vinyl halide copolymer, comprising a vinyl halide copolymer containing a structural unit derived from a vinyl halide monomer and a structural unit derived from a copolymerization monomer whose reactivity ratio r1 to vinylidene chloride is less than 0.7, wherein a mass ratio of the structural unit derived from the copolymerization monomer whose reactivity ratio r1 is less than 0.7 is 1 part by mass or more with respect to 100 parts by mass in total of the structural unit derived from the vinyl halide monomer, the structural unit derived from the copolymerization monomer whose reactivity ratio r1 is less than 0.7, and a structural unit derived from a copolymerization monomer whose reactivity ratio r1 to vinylidene chloride is 0.7 or more, and $S1/(S1+S2)$ is 0 or more and 0.33 or less, where S1 is an area of a melting peak having a melting peak temperature of 170° C. or more, and S2 is an area of a melting peak having a melting peak temperature less than 170° C.

[2] The water dispersion of a vinyl halide copolymer according to [1], wherein the vinyl halide monomer is vinylidene chloride.

[3] The water dispersion of a vinyl halide copolymer according to [1] or [2], wherein the copolymerization monomer whose reactivity ratio r1 is less than 0.7 is at least one selected from the group consisting of a nitrile group-containing monomer, a carboxyl group-containing monomer, and methyl methacrylate.

[4] The water dispersion of a vinyl halide copolymer according to any one of [1] to [3], wherein the copolymerization monomer whose reactivity ratio r1 is less than 0.7 contains a nitrile group-containing monomer, and a mass ratio of a structural unit derived from the nitrile group-containing monomer is more than 1.5 parts by mass with respect to 100 parts by mass in total of the structural unit derived from the vinyl halide monomer, the structural unit derived from the copolymerization monomer whose reactivity ratio r1 is less than 0.7, and the structural unit derived from the copolymerization monomer whose reactivity ratio r1 is 0.7 or more.

[5] The water dispersion of a vinyl halide copolymer according to [3] or [4], wherein the copolymerization monomer whose reactivity ratio r1 is less than 0.7 contains methacrylonitrile.

[6] The water dispersion of a vinyl halide copolymer according to [5], wherein a mass ratio of a structural unit derived from the methacrylonitrile is 5 parts by mass or more with respect to 100 parts by mass in total of the structural unit derived from the vinyl halide monomer, the structural unit derived from the copolymerization monomer whose reactivity ratio r1 is less than 0.7, and the structural unit derived from the copolymerization monomer whose reactivity ratio r1 is 0.7 or more.

[7] The water dispersion of a vinyl halide copolymer according to any one of [3] to [6], wherein the nitrile group-containing monomer is methacrylonitrile.

[8] The water dispersion of a vinyl halide copolymer according to any one of [3] to [7], wherein the carboxyl group-containing monomer is acrylic acid, itaconic acid, maleic acid, or methacrylic acid.

[9] The water dispersion of a vinyl halide copolymer according to any one of [1] to [8], wherein the mass ratio of the structural unit derived from the copolymerization monomer whose reactivity ratio r1 is less than 0.7 is 5 parts by mass or more and 20 parts by mass or less.

[10] The water dispersion of a vinyl halide copolymer according to any one of [1] to [8], wherein a mass ratio of the structural unit derived from the vinyl halide monomer is 86 parts by mass or more with respect to 100 parts by mass in total of the structural unit derived from the vinyl halide monomer, the structural unit derived from the copolymerization monomer whose reactivity ratio r1 is less than 0.7, and the structural unit derived from the copolymerization monomer whose reactivity ratio r1 is 0.7 or more, and the mass ratio of the structural unit derived from the copolymerization monomer whose reactivity ratio r1 is less than 0.7 is 14 parts by mass or less.

[11] The water dispersion of a vinyl halide copolymer according to any one of [1] to [10], comprising 20 parts by mass or less of a crystal nucleating agent with respect to 100 parts by mass of the vinyl halide copolymer.

[12] A film comprising a layer formed by coating the water dispersion of a vinyl halide copolymer according to any one of [1] to [11].

Advantageous Effect

It is thus possible to provide a water dispersion of a vinyl halide copolymer having excellent film formation property after long-term storage while maintaining high water vapor barrier property of a film after coating.

DETAILED DESCRIPTION

Figure 1:
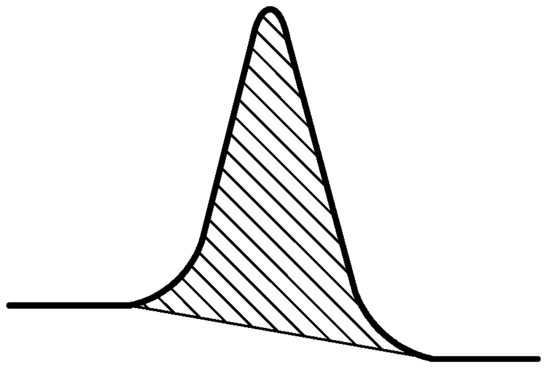
FIG. 1 is a diagram illustrating an example of a melting peak.

One of the disclosed embodiments (hereafter simply referred to as "this embodiment") will be described in detail below. This embodiment is illustrative for describing the presently disclosed techniques, and the present disclosure is not limited to the following description. Modifications can be made as appropriate within the scope of the present disclosure.

[Water Dispersion]

A water dispersion according to this embodiment comprises a vinyl halide copolymer.

(Vinyl Halide Copolymer)

The vinyl halide copolymer contains at least a structural unit derived from a vinyl halide monomer and a structural unit derived from a copolymerization monomer whose reactivity ratio r1 to vinylidene chloride is less than 0.7. The vinyl halide copolymer may contain one or more structural units derived from other monomers.

Herein, a monomer copolymerizable with the vinyl halide monomer is also referred to as "copolymerization monomer". Examples of the copolymerization monomer include a copolymerization monomer whose reactivity ratio r1 to vinylidene chloride is less than 0.7 (also referred to as "copolymerization monomer whose reactivity ratio r1 is less than 0.7") and a copolymerization monomer whose reactivity ratio r1 to vinylidene chloride is 0.7 or more (also referred to as "copolymerization monomer whose reactivity ratio r1 is 0.7 or more").

The term "other monomers" denotes monomers other than the vinyl halide monomer and the copolymerization monomer.

The mass ratio of the structural unit derived from the vinyl halide monomer is preferably 80 parts by mass or more, more preferably 85 parts by mass or more, further preferably 86 parts by mass or more, and particularly preferably 87 parts by mass or more, with respect to 100 parts by mass in total of the structural unit derived from the vinyl halide monomer, the structural unit derived from the copolymerization monomer whose reactivity ratio r1 is less than 0.7, and a structural unit derived from a copolymerization monomer whose reactivity ratio r1 is 0.7 or more. The mass ratio is preferably 99 parts by mass or less, more preferably 95 parts by mass or less, further preferably 93 parts by mass or less, still further preferably 92 parts by mass or less, and particularly preferably 90 parts by mass or less.

The mass ratio of the structural unit derived from the vinyl halide monomer, the below-described mass ratio of the structural unit derived from the copolymerization monomer whose reactivity ratio r1 is less than 0.7, and the below-described mass ratio of the structural unit derived from the copolymerization monomer whose reactivity ratio r1 is 0.7 or more may be set within the respective ranges described above or below so that the total of the structural unit derived from the vinyl halide monomer, the structural unit derived from the copolymerization monomer whose reactivity ratio r1 is less than 0.7, and the structural unit derived from the copolymerization monomer whose reactivity ratio r1 is 0.7 or more will be 100 parts by mass.

The mass ratio of the structural unit derived from the copolymerization monomer whose reactivity ratio r1 is less than 0.7 is preferably 20 parts by mass or less, more preferably 15 parts by mass or less, further preferably 14 parts by mass or less, and particularly preferably 13 parts by mass or less, with respect to 100 parts by mass in total of the structural unit derived from the vinyl halide monomer, the structural unit derived from the copolymerization monomer whose reactivity ratio r1 is less than 0.7, and the structural unit derived from the copolymerization monomer whose reactivity ratio r1 is 0.7 or more. The mass ratio is 1 part by mass or more, preferably 5 parts by mass or more, and particularly preferably 7 parts by mass or more.

The total mass ratio of the structural unit derived from the vinyl halide monomer and the structural unit derived from the copolymerization monomer whose reactivity ratio r1 is less than 0.7 with respect to 100 mass % of the vinyl halide copolymer is preferably 85 mass % or more, more preferably 90 mass % or more, further preferably 95 mass % or more, and particularly preferably 100 mass %.

The vinyl halide copolymer may optionally contain the structural unit derived from the copolymerization monomer whose reactivity ratio r1 to vinylidene chloride is 0.7 or more.

The mass ratio of the structural unit derived from the copolymerization monomer whose reactivity ratio r1 is 0.7 or more is preferably 5 parts by mass or less and more preferably 3 parts by mass or less, with respect to 100 parts by mass in total of the structural unit derived from the vinyl halide monomer, the structural unit derived from the copolymerization monomer whose reactivity ratio r1 is less than 0.7, and the structural unit derived from the copolymerization monomer whose reactivity ratio r1 is 0.7 or more.

If the mass ratio of each of the foregoing components in the vinyl halide copolymer is within the foregoing range, a film having a layer formed from the water dispersion of the vinyl halide copolymer according to this embodiment has sufficient barrier property to preserve the quality of the contents.

The vinyl halide monomer is preferably vinylidene chloride.

One vinyl halide monomer may be used alone, or two or more vinyl halide monomers may be used in combination.

Suppose vinylidene chloride is monomer 1 (M1), and a comonomer is monomer 2 (M2). The reactivity ratio r1 to vinylidene chloride is a typical monomer reactivity ratio r1 calculated as r1=k11/k12, where k11 is the reaction rate constant of reaction of the radical of M1 with M1, and k12 is the reaction rate constant of reaction of the radical of M1 with M2. As the reactivity ratio r1, the value described in Polymer Handbook Forth Edition (ISBN: 0-471-48171-8) may be used. In the case where a plurality of values are listed, the lowest value is used.

In the case where there is no description in Polymer Handbook Forth Edition, a value in a known document is used. In the case where there is no value in a known document, bulk polymerization, solution polymerization, or suspension polymerization may be performed to determine the reactivity ratio by the Kelen-Tudos method. In the case where there is a difference in reactivity ratio r1 as a result of a plurality of measurements, the lowest value is used.

In the case where the ratio of a monomer whose reactivity ratio r1 is unknown is relatively low among the monomers constituting the synthesized vinyl halide copolymer and, regardless of the value of the reactivity ratio r1 of the monomer whose reactivity ratio r1 is unknown, its magnitude relationship with a threshold to be compared is the same, the reactivity ratio r1 may be treated as unknown. For example, suppose the mass composition of VDC/MA/"monomer whose reactivity ratio r1 is unknown" is 90/8/2. When determining whether the ratio of the monomer whose reactivity ratio r1 is less than 0.7 is 4 parts by mass or less, even if the reactivity ratio r1 of the monomer whose reactivity ratio r1 is unknown is less than 0.7, the ratio of the monomer whose reactivity ratio r1 is less than 0.7 is only 2 parts by mass as a whole. In such a case, the reactivity ratio r1 of the monomer whose reactivity ratio r1 is unknown may be treated as unknown.

For example, the reactivity ratios r1 of some monomers to vinylidene chloride are as follows:

butyl acrylate: 0.84
ethyl acrylate: 0.58
methyl acrylate: 0.7
acrylic acid: 0.29
acrylonitrile: 0.28
methyl methacrylate: 0.02
methacrylic acid: 0.15
methacrylonitrile: 0.036
vinyl chloride: 1.8.

As the copolymerization monomer whose reactivity ratio r1 to vinylidene chloride is less than 0.7, a known monomer may be used. The copolymerization monomer whose reactivity ratio r1 to vinylidene chloride is less than 0.7 is preferably methyl methacrylate (hereafter denoted as "MMA"), a nitrile group-containing monomer, and a carboxyl group-containing monomer.

The reactivity ratio r1 of the copolymerization monomer whose reactivity ratio r1 to vinylidene chloride is less than 0.7 may be more than 0.

One copolymerization monomer whose reactivity ratio r1 is less than 0.7 may be used alone, or two or more copolymerization monomers whose reactivity ratio r1 is less than 0.7 may be used in combination.

The nitrile group-containing monomer is preferably acrylonitrile (hereafter denoted as "AN") or methacrylonitrile (hereafter denoted as "MAN"), and particularly preferably methacrylonitrile.

The carboxyl group-containing monomer is preferably acrylic acid (hereafter denoted as "AA"), itaconic acid, maleic acid, or methacrylic acid (hereinafter referred to as "MAA"), and more preferably acrylic acid or methacrylic acid.

As the monomer whose reactivity ratio r1 to vinylidene chloride is 0.7 or more, a known monomer may be used. The monomer whose reactivity ratio r1 to vinylidene chloride is 0.7 or more is preferably vinyl chloride, methyl acrylate (hereafter denoted as "MA"), or butyl acrylate.

The copolymerization monomer whose reactivity ratio r1 is less than 0.7 preferably contains at least the nitrile group-containing monomer, and more preferably contains at least methacrylonitrile. It is particularly preferable that methacrylonitrile is the only nitrile group-containing monomer contained in the copolymerization monomer whose reactivity ratio r1 is less than 0.7.

The mass ratio of the structural unit derived from the nitrile group-containing monomer is preferably 1 part by mass or more, more preferably more than 1.5 parts by mass, and further preferably 3 parts by mass or more, and preferably 30 parts by mass or less and more preferably 20 parts by mass or less, with respect to 100 parts by mass in total of the structural unit derived from the vinyl halide monomer, the structural unit derived from the copolymerization monomer whose reactivity ratio r1 is less than 0.7, and the structural unit derived from the copolymerization monomer whose reactivity ratio r1 is 0.7 or more. In the case where a plurality of nitrile group-containing monomers are contained, the mass ratio of the structural unit derived from the nitrile group-containing monomer denotes the total mass ratio of all of the structural units derived from the nitrile group-containing monomers.

The mass ratio of the structural unit derived from methacrylonitrile is preferably more than 0 parts by mass, more preferably 1 part by mass or more, further preferably more than 1.5 parts by mass, still further preferably 3 parts by mass or more, and particularly preferably 5 parts by mass or more, and preferably 30 parts by mass or less and more preferably 20 parts by mass or less, with respect to 100 parts by mass in total of the structural unit derived from the vinyl halide monomer, the structural unit derived from the copolymerization monomer whose reactivity ratio r1 is less than 0.7, and the structural unit derived from the copolymerization monomer whose reactivity ratio r1 is 0.7 or more. In the case where methacrylonitrile and another nitrile group-containing monomer are contained as nitrile group-containing monomers, the mass ratio of the structural unit derived from methacrylonitrile is the mass ratio of only the structural unit derived from methacrylonitrile excluding the other nitrile group-containing monomer.

As a result of copolymerizing such monomers, a film produced from the water dispersion of the vinyl halide copolymer has high water vapor barrier property.

The monomer composition of the vinyl halide copolymer can be evaluated by dissolving a sample collected by one of the below-described methods in tetrahydrofuran-d8 and performing NMR measurement.

1) The following method is used in the case where the water dispersion of the vinyl halide copolymer is available.

10 ml of the water dispersion of the vinyl halide copolymer is freeze-dried, and 0.5 g of the freeze-dried product is collected. 40 ml of methanol is added dropwise to a solution prepared by dissolving the collected freeze-dried product in 10 ml of tetrahydrofuran having a purity of 99.9 wt % or more. The resultant precipitate is filtered to collect the remaining insoluble component.

The collected insoluble component is used as a measurement sample.

2) The following method is used in the case where the water dispersion of the vinyl halide copolymer is not available and only a film coated with the water dispersion is available.

The vinyl halide copolymer is separated from the film coated with the vinyl halide copolymer, and 0.5 g of the vinyl halide copolymer is collected and completely dissolved in 10 ml of tetrahydrofuran having a purity of 99.9 wt % or more. In the case where the vinyl halide copolymer does not dissolve at room temperature, the vinyl halide copolymer is heated to 60° C. or less to be completely dissolved. 40 ml of methanol is added dropwise to the solution, the resultant precipitate is filtered, and the remaining insoluble component is collected. The collected insoluble component is used as a measurement sample.

As a method of separating the vinyl halide copolymer from the film coated with the vinyl halide copolymer, one of the below-described methods (A) to (C) is used if possible. In detail, in the case where (A) is possible, (A) is used. In the case where (A) is difficult and (B) is possible, (B) is used. In the case where (A) and (B) are difficult and (C) is possible, (C) is used. In the case where all of (A) to (C) are difficult and there is any other means capable of separation, the means may be used. In such a case, it is preferable to perform washing and drying to minimize the content of impurities other than the vinyl halide copolymer in the separated product. The mass ratio of the impurities is preferably 0.5 wt % or less in the measurement sample. The conditions for the drying treatment are a temperature of 60° C. or less and a treatment time of 10 hr or less. Herein, the "impurities" denote components not contained in the water dispersion of the vinyl halide copolymer before coating, such as a primer and a solvent mixed in, and do not include additives originally added to the water dispersion, such as an emulsifier. The amount of the emulsifier in the separated product can be measured by the following procedure: i) The mass of the dried separated product is set as W1. ii) The separated product is washed with a large amount of pure water having a mass of 50 times or more. During the washing, the polymer is kept from flowing out. iii) The washed separated product is dried, and the mass of the dried washed separated product is set as W2. iv) The mass of the emulsifier is calculated as W1−W2.

(A) Physically peel off or scrape the vinyl halide copolymer with tweezers or the like.

(B) Chemically separate the vinyl halide copolymer using a solvent that does not dissolve the vinyl halide copolymer but dissolves the primer. The solvent is preferably acetone.

(C) Elute the vinyl halide copolymer using a solvent that dissolves the vinyl halide copolymer but does not dissolve the film as the substrate, and dry and separate the vinyl halide copolymer.

In the case where the vinyl halide copolymer is separated using the solvent by the method (B) or (C), the vinyl halide copolymer is dried in a drying furnace or the like within the range in which the vinyl halide copolymer does not decompose, and the measurement is performed after making sure that the weight of the solvent in the separated product is 0.5 wt % or less. The drying conditions are a temperature of 50° C. or less and a drying time of 10 hr or less. The drying is performed under reduced pressure if necessary.

The NMR measurement conditions are as follows:

Device: JEOL RESONANCE ECS 400 (1H), Bruker Biospin Avance 600 (13C).

Observation nucleus: 1H (399.78 MHz), 13C (150.91 MHz).

Pulse program: Single pulse (1H), zgig30 (13C).

Total number of times: 256 times (1H), 10000 times (13C).

Lock solvent: THF-d8.

Chemical shift standard: THF (1H: 180 ppm, 13C: 67.38 ppm).

Each monomer is assigned using the obtained NMR spectrum, and the peak is integrated to identify the composition in the copolymer.

For example, in the case of a polymer containing respective structural units derived from vinylidene chloride, methacrylonitrile, methyl methacrylate, and acrylic acid, in a spectrum of 13C-NMR, 80 ppm to 90 ppm are integrated to determine the content of the structural unit derived from vinylidene chloride, 110 ppm to 130 ppm are integrated to determine the content of the structural unit derived from methacrylonitrile, 170 ppm to 180 ppm are integrated to determine the content of the structural unit derived from methyl methacrylate, and 180 ppm to 200 ppm are integrated to determine the content of the structural unit derived from acrylic acid. The component ratio of each monomer to the whole polymer is then calculated.

In the calculation of the component ratio, the peak of $COOCH_3$ group (a in the following formula) is integrated in order to obtain the amount of methyl methacrylate. Methyl acrylate is equally a monomer having $COOCH_3$ group and often copolymerized with vinylidene chloride. To distinguish them, whether there is a peak of the methyl group (b in the following formula) bonded to the carbon of the main chain to which the $COOCH_3$ group is bonded in the 1HNMR spectrum is determined. The methyl group is not split because the carbon of the main chain to which the methyl group is bonded is not bonded to hydrogen, and has a peak position of about 2 ppm. In the case where there is a methyl group-containing monomer, such as methacrylonitrile, in addition to methyl methacrylate, there are a plurality of peaks of the methyl group at around 2 ppm. The distinguishment can thus be made.

[Chem. 1]

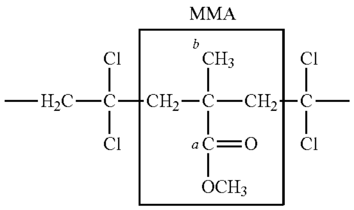

Likewise, the distinguishment between acrylonitrile and methacrylonitrile is made based on whether there is a peak of the methyl group (b in the foregoing formula).

The insoluble component is optionally subjected to additional measurement such as two-dimensional NMR measurement, infrared spectroscopy, etc., to assign each monomer. A copolymer having a known composition may be polymerized and measured in the same way for comparison.

(Characteristics of Water Dispersion)

The maximum melting peak temperature (maximum melting point) and the melting peak area of the water dispersion of the vinyl halide copolymer can be evaluated using a sample produced by one of the below-described two methods (i) and (ii). The maximum melting peak temperature is preferably 170° C. or less, and particularly preferably 160° C. or less.

S1/(S1+S2) is preferably 0 or more and 0.33 or less, particularly preferably 0.31 or less, and further preferably 0.26 or less, where S1 is the area of a melting peak having a melting peak temperature of 170° C. or more of the water dispersion of the vinyl halide copolymer, and S2 is the area of a melting peak having a melting peak temperature less than 170° C.

(i) The following method is used in the case where the water dispersion of the vinyl halide copolymer is available.

The water dispersion of the vinyl halide copolymer is coated onto an aluminum plate with a Mayer bar so as to be 10 g/$m^2$ in dry coating amount, and dried in an oven maintained at 100° C. The dried film is peeled off with tweezers within 5 min, to collect a single film of the vinyl halide copolymer. 5 mg is collected from the single film and used for measurement.

In the case where an additive such as a crystal nucleating agent is added to the water dispersion, sample preparation and measurement are performed using the water dispersion having the additive added thereto.

(ii) The following method is used in the case where the water dispersion of the vinyl halide copolymer is not available and only a film coated with the water dispersion is available.

The vinyl halide copolymer is separated from the film coated with the vinyl halide copolymer, and 5 mg of the vinyl halide copolymer is collected and used for measurement.

As a method of separating the vinyl halide copolymer from the film coated with the vinyl halide copolymer, one of the below-described methods (A) to (C) is used if possible. In detail, in the case where (A) is possible, (A) is used. In the case where (A) is difficult and (B) is possible, (B) is used. In the case where (A) and (B) are difficult and (C) is possible, (C) is used. In the case where all of (A) to (C) are difficult and there is any other means capable of separation, the means may be used. In such a case, it is preferable to perform washing and drying to minimize the content of impurities other than the vinyl halide copolymer in the separated product. The mass ratio of the impurities is preferably 0.5 wt % or less in the measurement sample. The conditions for the drying treatment are a temperature of 60° C. or less and a treatment time of 10 hr or less. Herein, the "impurities" denote components not contained in the water dispersion of the vinyl halide copolymer before coating, such as a primer and a solvent mixed in, and do not include additives originally added to the water dispersion, such as an emulsifier. The amount of the emulsifier in the separated product can be measured by the following procedure: i) The mass of the dried separated product is set as W1. ii) The separated product is washed with a large amount of pure water having a mass of 50 times or more. During the washing, the polymer is kept from flowing out. iii) The washed separated product is dried, and the mass of the dried washed separated product is set as W2. iv) The mass of the emulsifier is calculated as W1−W2.

(A) Physically peel off or scrape the vinyl halide copolymer with tweezers or the like.

(B) Chemically separate the vinyl halide copolymer using a solvent that does not dissolve the vinyl halide copolymer but dissolves the primer. The solvent is preferably acetone.

(C) Elute the vinyl halide copolymer using a solvent that dissolves the vinyl halide copolymer but does not dissolve the film as the substrate, and dry and separate the vinyl halide copolymer.

In the case where the vinyl halide copolymer is separated using the solvent by the method (B) or (C), the vinyl halide copolymer is dried in a drying furnace or the like within the range in which the vinyl halide copolymer does not decompose, and the measurement is performed after making sure that the weight of the solvent in the separated product is 0.5 wt % or less. The drying conditions are a temperature of 50° C. or less and a drying time of 10 hr or less. The drying is performed under reduced pressure if necessary.

The sample collected by the foregoing method is heated to 170° C. at 10° C./min in a nitrogen atmosphere using differential scanning calorimeter Q-2000 produced by TA Instruments, Inc., and cooled to −40° C. at 10° C./min. The sample is then heated to 190° C. at 10° C./min, and measurement data up to 190° C. is acquired. Of the acquired measurement data up to 190° C., data at 180° C. or more is not used because decomposition of vinylidene chloride starts at 180° C. or more, and measurement values from −40° C. to 180° C. during the second heating are used to determine the maximum melting peak temperature.

In this measurement, Tzero Pan and Tzero Hermetic Lid (produced by TA Instruments, Inc.) of aluminum are used as a sample pan, and an empty pan of this pan is used as a reference. The maximum melting peak temperature is calculated based on the value obtained by subtracting the empty pan measurement result from the sample measurement result.

Next, a baseline is drawn by one of the below-described methods, and the area of the melting peak at less than 170° C. is calculated using Integrate Peak Linear in analysis tool TA Universal Analysis of Q-2000 and taken to be S2. If there is no melting peak at less than 170° C., S2 is set to 0.

A baseline is drawn by one of the below-described methods, and the area of the melting peak at 170° C. or more is calculated using Integrate Peak Linear in analysis tool TA Universal Analysis of Q-2000 and taken to be S1. If there is no melting peak at 170° C. or more, S1 is set to 0.

The obtained values of S1 and S2 are rounded to one decimal place.

Figure 6:
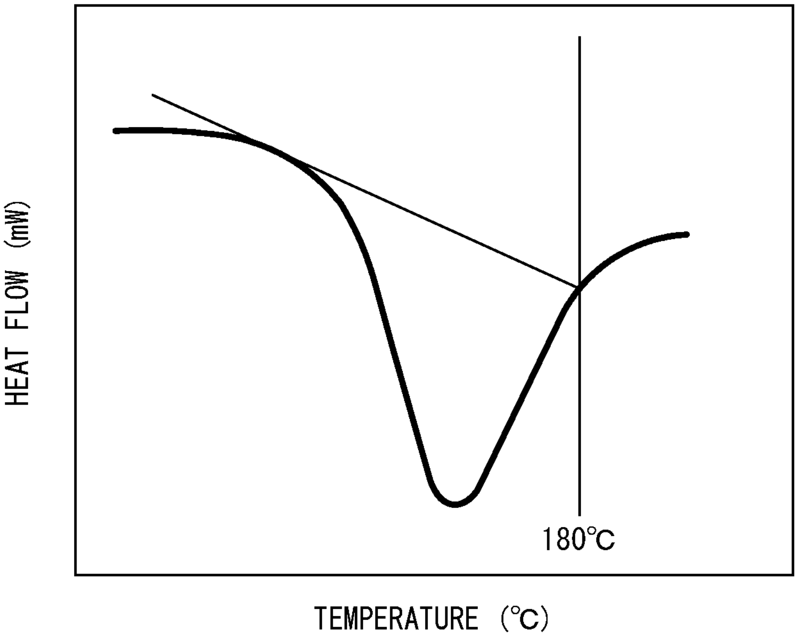
FIG. 6 is an explanatory diagram of a manner (IV) of drawing a baseline of a peak.

In some cases, the baseline is not on the same straight line. Such examples are described in a document (Inorganic Materials, vol. 3, July 271-283 (1996)). FIG. 6(*a*) in the document is illustrated in FIG. 1 for reference.

Some baseline drawing methods will be described below as examples. In the case where there are a plurality of peaks, a baseline is drawn for each peak and the area is calculated. In the following cases, when a plurality of tangent lines can be drawn, a tangent line having the largest absolute value of inclination is used as the tangent line to the curve.

Figure 2:
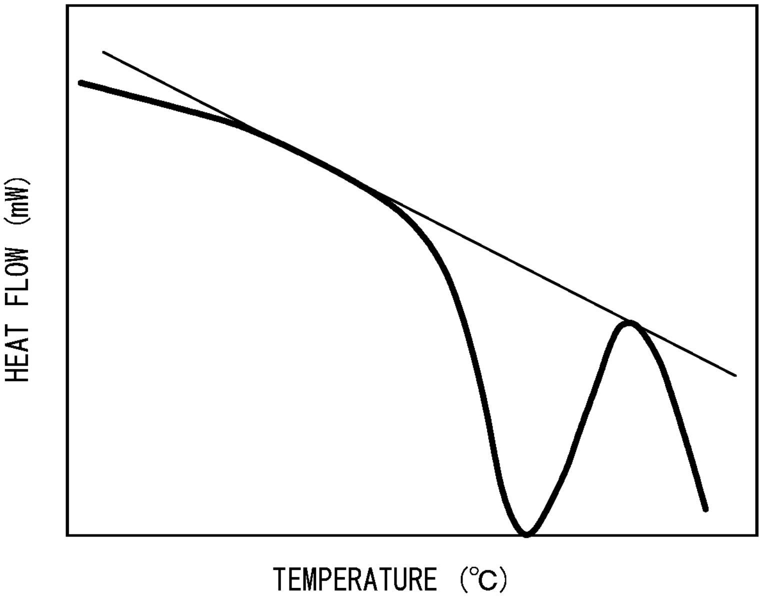
FIG. 2 is an explanatory diagram of a manner (I) of drawing a baseline of a peak.

(I) In the case where one tangent line tangent to the curves on the positive side and the negative side of the peak can be drawn (FIG. 2), the tangent line to the curves on the positive side and the negative side is set as the baseline.

Figure 3:
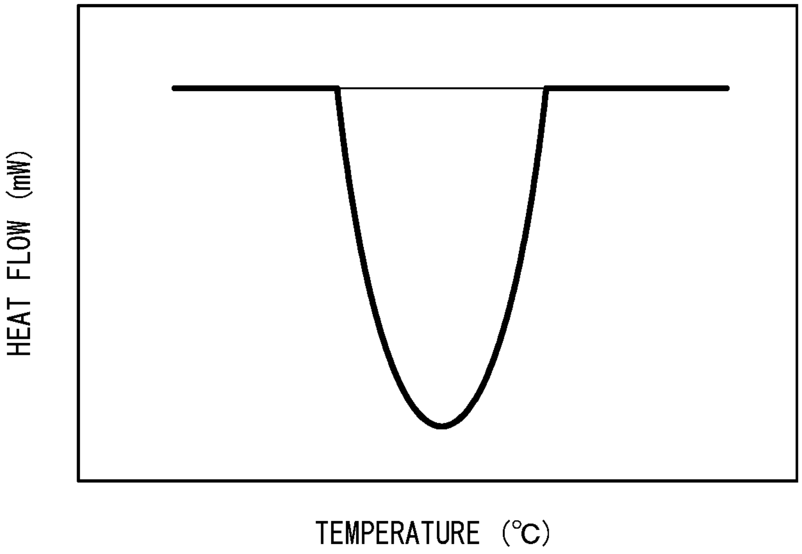
FIG. 3 is an explanatory diagram of a manner (II) of drawing a baseline of a peak.
Figure 4:
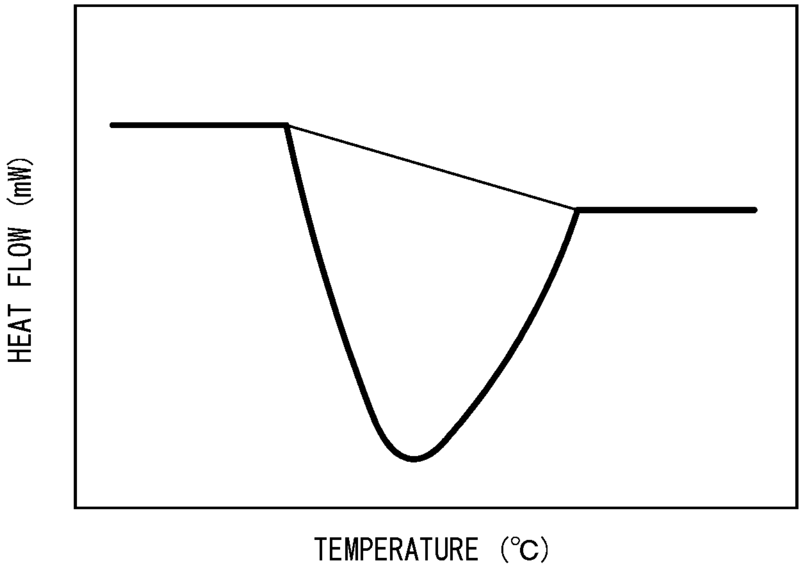
FIG. 4 is an explanatory diagram of the manner (II) of drawing a baseline of a peak.

(II) In the case where (I) does not apply and the peak is located between lines parallel to the horizontal axis on both the positive side and the negative side of the peak (FIG. 3, FIG. 4), a line connecting two points which are on the positive side and the negative side across the peak and at which the heat absorption line on the positive side and the negative side of the peak cease to be parallel to the horizontal axis (i.e. the points at which positive inclination or negative inclination begins) is set as the baseline.

Figure 5:
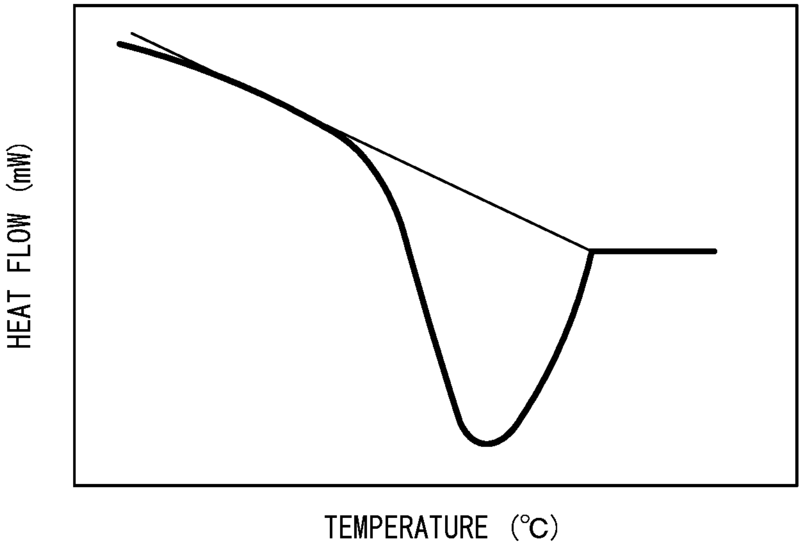
FIG. 5 is an explanatory diagram of a manner (III) of drawing a baseline of a peak.

(III) In the case where (I) and (II) do not apply and one of the positive side and the negative side of the peak is a line parallel to the horizontal axis and the other one of the positive side and the negative side of the peak is a curve (FIG. 5), a tangent line drawn from the point at which the line parallel to the horizontal axis ceases to be parallel to the horizontal axis to the curve is set as the baseline.

(IV) In the case where (I), (II), and (III) do not apply and the positive side of the peak is beyond the upper limit of measurement of 180° C. (FIG. 6), a tangent line drawn from the point at 180° C. to the negative side of the peak is set as the baseline. In the case where the negative side of the peak is a line parallel to the horizontal axis, a line connecting the point at 180° C. and the point at which the line parallel to the horizontal axis ceases to be parallel to the horizontal axis may be set as the baseline.

Figure 7:
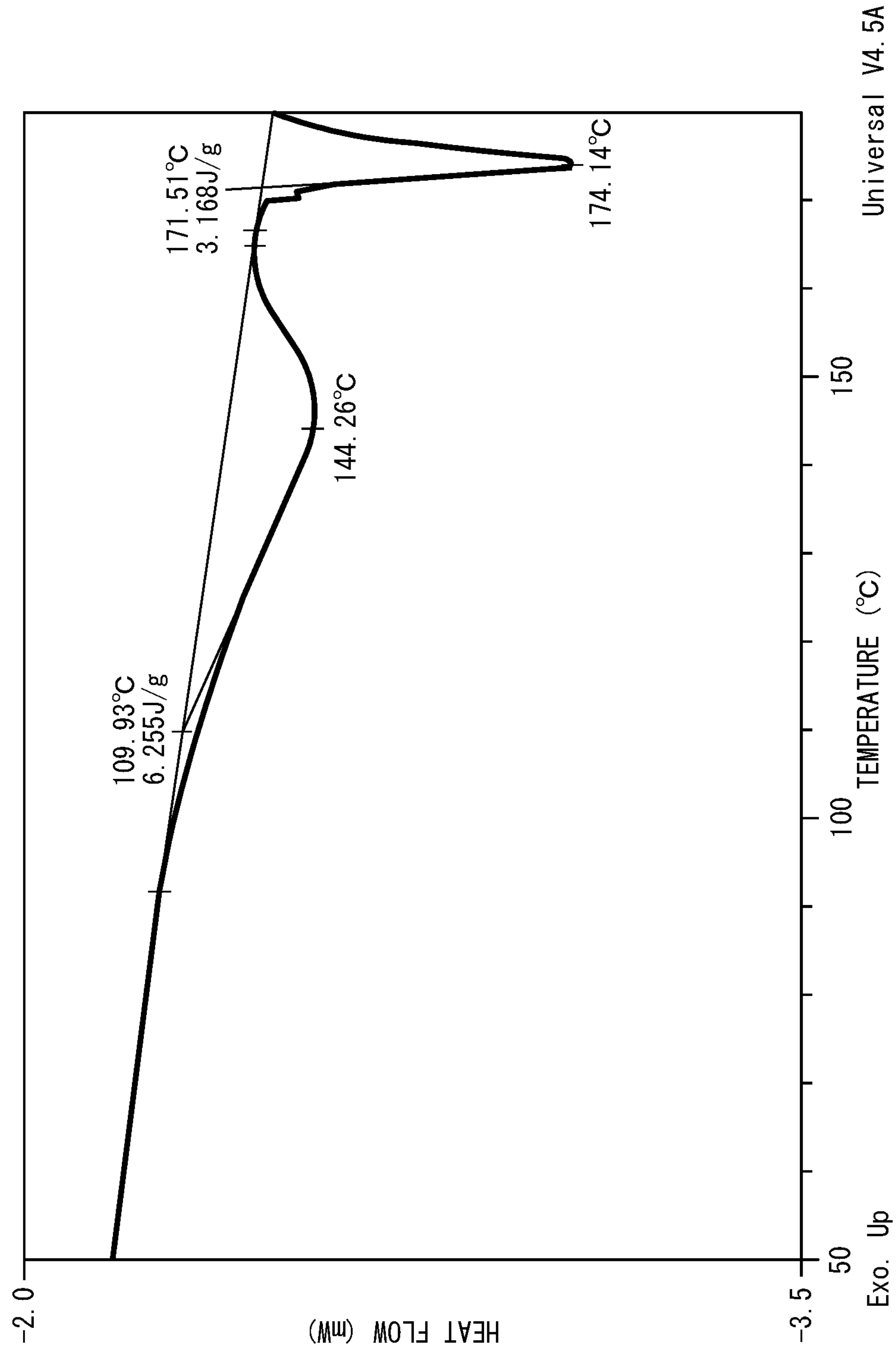
FIG. 7 is a diagram illustrating an example of calculating a peak area from a heat absorption curve.

FIG. 7 illustrates an actual example of calculating the area of a spectrum. Only the heat absorption curve in the second heating is illustrated in the drawing. In this example, S1 was 3.2 J/g, and S2 was 6.3 J/g.

(Method of Producing Water Dispersion)

The water dispersion of the vinyl halide copolymer according to this embodiment can be produced by subjecting a monomer mixture to emulsion polymerization. The emulsion polymerization is typically performed at a temperature of 30° C. to 70° C., without being limited thereto. The polymerization temperature is preferably in a range of 40° C. to 60° C. As a result of the polymerization temperature being 70° C. or less, the decomposition of the raw material during the polymerization can be suppressed, which is preferable. As a result of the polymerization temperature being 30° C. or more, the polymerization rate can be increased, which contributes to higher polymerization efficiency.

The vinyl halide copolymer is a copolymer containing a copolymerization monomer whose reactivity ratio r1 to vinylidene chloride is less than 0.7 (i.e. a monomer that does not easily react with vinylidene chloride) and a vinyl halide monomer. Thus, in a reactor, the copolymerization monomer whose reactivity ratio r1 is less than 0.7 is consumed preferentially over the vinyl halide monomer. Accordingly, in the case where unreacted monomers accumulate during the reaction, the unreacted monomers are mixed monomers containing the vinyl halide monomer more than the charged amount. Consequently, block having a large amount of the vinyl halide monomer are formed in the copolymer in the final stage of polymerization, as a result of which the vinyl halide copolymer has a high melting point. In notable cases, the generated copolymer has two melting peaks, and the melting peak area of 170° C. or more is larger when more blocks of the vinyl halide monomer are formed.

A water dispersion in which blocks having a large amount of the vinyl halide monomer are formed is susceptible to film formation defects caused by crystallization starting from such blocks during long-term storage.

To improve the film formation property after long-term storage, it is important to polymerize a copolymer having a small melting peak area of 170° C. or more, that is, a small amount of blocks having a large amount of the vinyl halide monomer.

The method of controlling the melting peak area of 170° C. or more of the vinyl halide copolymer is not limited. For example, the below-described methods may be used singly or in combination.

Method 1 of Controlling Melting Peak Area of 170° C. or More

For example, the vinyl halide monomer and the copolymerization monomer whose reactivity ratio r1 is less than 0.7 used in the emulsion polymerization of the water dispersion of the vinyl halide copolymer according to this embodiment may be mixed in a predetermined amount before the polymerization, and charged continuously or charged in batches stepwise. The amount of the vinyl halide monomer and the copolymerization monomer whose reactivity ratio r1 is less than 0.7 added per 1 hr in the continuous or stepwise charging is preferably not more than the amount of the vinyl halide monomer and the copolymerization monomer whose reactivity ratio r1 is less than 0.7 consumed during the polymerization per 1 hr. The amount of the vinyl halide monomer and the copolymerization monomer whose reactivity ratio r1 is less than 0.7 added per 1 hr in the continuous or stepwise charging is preferably 95 mass % or less, more preferably 90 mass % or less, and further preferably 85 mass % or less of the total amount of the vinyl halide monomer and the copolymerization monomer whose reactivity ratio r1 is less than 0.7 consumed during the polymerization per 1 hr.

For example, in the case where the polymerization temperature is 50° C., 80 parts by mass of the monomer raw materials with respect to 100 parts by mass of the total mass of the vinyl halide monomer and the copolymerization monomer whose reactivity ratio r1 is less than 0.7 to be added are added preferably over a period of 20 hr or more, particularly preferably over a period of 25 hr or more, and further preferably over a period of 30 hr or more. It is preferable to optimize the continuous or stepwise charging time depending on the polymerization temperature. In a preferred embodiment, the monomers are batch-charged in the initial stage of polymerization and subsequently the remaining amount is continuously charged. An example is to charge, at the start of polymerization, 1 part to 30 parts by mass of the vinyl halide monomer and the copolymerization monomer whose reactivity ratio r1 is less than 0.7 with respect to 100 parts by mass of the total mass of the vinyl halide monomer and the copolymerization monomer whose reactivity ratio r1 is less than 0.7 contained in the raw material monomers, and subsequently charge the vinyl halide monomer and the copolymerization monomer whose reactivity ratio r1 is less than 0.7 at the foregoing preferable ratio per 1 hr. As a result of continuously charging the monomers at the foregoing rate, the accumulation of unreacted monomers in the reactor can be reduced, and consequently the melting peak area of 170° C. or more of the copolymer can be reduced.

Method 2 of Controlling Melting Peak Area of 170° C. or More

The total amount of a polymerization initiator added during the polymerization is preferably 0.015 parts by mass or more, more preferably 0.04 parts by mass or more, and particularly preferably 0.08 parts by mass or more, with respect to 100 parts by mass of the vinyl halide copolymer. As a result of adding the polymerization initiator in the total amount of this range, the accumulation of unreacted monomers in the reactor can be reduced, and consequently the melting peak area of 170° C. or more of the copolymer can be reduced.

The polymerization initiator is preferably continuously charged over a period of time longer than or equal to the time for continuously charging the monomers.

In addition, it is preferable to add a polymerization activator for accelerating the radical decomposition of the initiator.

Method 3 of Controlling Melting Peak Area of 170° C. or More

In the emulsion polymerization of the vinyl halide copolymer, after the end of the continuous charging of the monomers, the addition of the initiator, the polymerization activator, and/or the emulsifier may be continued until the internal pressure drops, but it is preferable to end the addition before the internal pressure drops. As a result of ending the polymerization before the internal pressure drops, the unreacted monomers accumulated in the reactor and containing a large amount of the vinyl halide monomer can be left unreacted, and consequently the melting peak area of 170° C. or more of the copolymer can be reduced.

Method 4 of Controlling Melting Peak Area of 170° C. Or More

The ratio of the vinyl halide monomer in the raw material monomers is decreased.

As a result of decreasing the ratio of the vinyl halide monomer, the amount of the vinyl halide monomer accumulated at the end of the polymerization can be reduced, and consequently the melting peak area of 170° C. or more of the copolymer can be reduced.

Examples of surfactants that can be used in the emulsion polymerization of the water dispersion of the vinyl halide copolymer include anionic surfactants such as alkyl sulfate ester salts, alkyl benzene sulfonate, alkyl sulfosuccinate, alkyl diphenyl ether disulfonate, and alkyl sulfonic acid.

Examples of the polymerization initiator include persulfates such as sodium persulfate and potassium persulfate, and peroxides such as hydrogen peroxide, t-butyl hydroperoxide, and cumene hydroperoxide. t-butyl hydroperoxide is preferable.

For example, as the polymerization activator, it is preferable to add a polymerization activator for accelerating the radical decomposition of the initiator, such as sodium hydrogen sulfite or sodium D-alaboascorbate.

These polymerization additives are not limited, and may be, for example, of types conventionally preferably used in the present technical field.

The vinyl halide copolymer particles contained in the water dispersion of the vinyl halide copolymer according to this embodiment are not limited, but preferably have an average particle size of 10 nm to 1000 nm. As a result of the average particle size being in this range, the water dispersion has good storage stability and thus the coatability is improved.

The solid content of the water dispersion of the vinyl halide copolymer according to this embodiment is not limited, and is typically 10 mass % to 70 mass %.

A crystal nucleating agent is preferably added to the water dispersion of the vinyl halide copolymer according to this embodiment. The crystal nucleating agent is an additive that promotes crystallization of a film on which the water dispersion is formed, and a known additive that promotes crystallization of resin may be used.

Examples of such an additive include phosphate metal salts, benzoic acid metal salts, pimelic acid metal salts, rosin metal salts, benzylidene sorbitol, quinacridone, cyanine blue, oxalate metal salts, stearic acid metal salts, ionomers, high melting point PET, carbon black, metal oxide, metal sulfate, kaolin, clay, high melting point polyamide, crystalline resin having a composition different from that of the vinyl halide copolymer according to this embodiment, silica, titanium oxide, wax, and highly crystalline vinyl halide copolymer particles different from the vinyl halide copolymer according to this embodiment. One of these additives may be used, or two or more of these additives may be used together.

Silica, titanium oxide, wax, and highly crystalline vinyl halide copolymer particles are preferable, and wax and highly crystalline vinyl halide copolymer particles are particularly preferable.

The amount of the crystal nucleating agent added is preferably 20 parts by mass or less, more preferably 10 parts by mass or less, further preferably 5 parts by mass or less, and particularly preferably 2 parts by mass or less, with respect to 100 parts by mass of the vinyl halide copolymer. The amount of the crystal nucleating agent added is preferably 0.05 parts by mass or more.

In the case where a plurality of crystal nucleating agents are added, the total amount is used.

Herein, the term "wax" is understood to refer to any natural or synthetic wax. Non-limiting examples include Japan wax, lacquer wax, sugarcane wax, palm wax, candelilla wax, jojoba oil, beeswax, whale wax, tree wax, wool wax, FT wax, paraffin wax, microwax, carnauba wax, yellow wax, Chinese insect wax, ozokerite, polyolefin wax, montan wax, and esters thereof.

The highly crystalline vinyl halide copolymer particles have a melting peak area ratio S1/(S1+S2) of more than 0.33. The maximum melting peak temperature is 160° C. or more, and particularly preferably 170° C. or more. The maximum melting peak temperature is measured by the foregoing melting peak measurement method, and the maximum peak temperature in a range of 180° C. or less is used.

The highly crystalline vinyl halide copolymer particles are preferably vinylidene chloride copolymer particles, and particularly preferably particles of a vinylidene chloride copolymer obtained by copolymerizing 91 parts by mass or more of vinylidene chloride with respect to 100 parts by mass of the vinylidene chloride copolymer.

As a result of adding such crystal nucleating agents, the progress of crystallization after film formation is promoted, so that the film exhibits high water vapor barrier property.

Various components typically used may be optionally added to the water dispersion of the vinyl halide copolymer according to this embodiment. Examples include a defoamer, a rheology adjusting agent, a thickener, a dispersant, stabilizers such as a surfactant, a wetting agent, a plasticizer, a colorant, and silicone oil. Moreover, a light stabilizer, an ultraviolet absorber, a silane coupling agent, an inorganic filler, a coloring pigment, an extender pigment, and the like may be optionally added to the water dispersion.

A solvent for the water dispersion of the vinyl halide copolymer according to this embodiment may be water alone, or may contain water and another solvent (for example, alcohols, acetone, etc.). In the case where another solvent is contained, the amount of the other solvent is preferably 10 parts by mass or less with respect to 100 parts by mass of water.

The water dispersion of the vinyl halide copolymer according to this embodiment may be used as a coating material of a film used for blister packaging or the like.

[Film]

A film according to this embodiment has a layer formed by coating the above-described water dispersion of the vinyl halide copolymer according to this embodiment. The layer contains at least the above-described vinyl halide copolymer, and may be a layer made only of the above-described vinyl halide copolymer.

The film according to this embodiment preferably has a layer formed by applying the water dispersion of the vinyl halide copolymer according to this embodiment on a film substrate. The film substrate is not limited, and examples include films made of polyvinyl chloride, polyester, polyamide, and polypropylene. A film made of polyvinyl chloride is most commonly used. The thickness of the film substrate varies depending on the material used, but is typically 8 μm to 300 μm.

For example, the layer formed by coating the water dispersion of the vinyl halide copolymer may be formed so that the coating film mass after drying will be in a range of 1 $g/m^2$ to 200 $g/m^2$ and more typically in a range of 20 $g/m^2$ to 100 $g/m^2$, without being limited thereto.

The film according to this embodiment may optionally include, besides the layer formed by coating the water dispersion of the vinyl halide copolymer, a layer of a copolymer functionally adjusted mainly using a monomer having high polymerization activity other than vinyl halide. For example, a primer may be formed on the film substrate using an aqueous resin emulsion or an acrylic dispersion as such a layer, and the layer formed by coating the water dispersion of the vinyl halide copolymer according to this embodiment may be provided on the primer.

It is preferable that the water dispersion of the vinyl halide copolymer according to this embodiment is applied to the film substrate described above, and the resultant film is used as blister packaging. The obtained blister packaging has excellent barrier property (for example, water vapor barrier property).

The film according to this embodiment is not limited to being used for blister packaging, and may be used as a coating agent to form a clear film.

As the method of coating the film substrate with the water dispersion of the vinyl halide copolymer according to this embodiment, the surface of the material to be coated may be coated with the water dispersion of the vinyl halide copolymer by a known method such as air spray, airless, roll coater, curtain flow coating, roll coating, dip coating, or spin coating. After the coating of the film substrate, the resultant film is typically held at normal temperature or in a heated state for a predetermined time to be dried.

For the water dispersion of the vinyl halide copolymer according to this embodiment and the film having the layer formed by applying the water dispersion, the water vapor barrier property and the film formation property after long-term storage can be evaluated using the following parameters (1) and (2).

(1) Water Vapor Barrier Property

The water vapor barrier property of the film having the layer formed by applying the water dispersion of the vinyl halide copolymer according to this embodiment can be evaluated under the conditions of 38° C. and 100% RH using water vapor permeability measurement device PERMATRAN 3/33 produced by MOCON, Inc. (unit: $g/m^2$/day at 38° C. and 100% RH).

The average value of the measurement values from 48 hr to 60 hr after the start of measurement is taken to be the water vapor permeability.

The measurement is performed four times, and the average value is used.

The desirable numerical range of the water vapor barrier is about 0.1 $g/m^2$/day to 10 $g/m^2$/day for general packaging applications, about 1.0 $g/m^2$/day or less for general pharmaceutical packaging (application amount 80 GSM), and 0.6 $g/m^2$/day or less for pharmaceutical packaging required to have high barrier property. The film having the layer formed by applying the water dispersion of the vinyl halide copolymer according to this embodiment can be used for applications that require high barrier property (for example, water vapor barrier property), and the water vapor permeability is preferably 0.6 $g/m^2$/day or less, more preferably 0.5 $g/m^2$/day or less, and further preferably 0.4 $g/m^2$/day or less.

(2) Film Formation Property after Long-Term Storage (Film Formation Life)

In a constant temperature and humidity chamber with a temperature of 23° C. and a humidity of 55%, 45 ml of the water dispersion is collected in a 50 ml sample bottle, which is then covered with the lid and left for 5 hr. Following this, in the constant temperature and humidity chamber, the temperature of a heat gradient tester (BIG HEART) produced by Imoto Machinery Co., Ltd. is adjusted so that one end will be 10° C. and the other end will be 30° C. After making sure that the heat gradient on the tester is 1° C. per 4 cm, the water dispersion is applied onto the tester with a 0.2 mm applicator and dried for 12 hr. The maximum temperature at which cracks having a diameter of 1 mm or more occur in the coating film is taken to be the minimum film formation temperature (MFT). The MFT is measured ten times for one sample, and the average value is used.

The produced water dispersion is stored at 23° C., and the MFT is measured every month. MFT change ΔMFT is calculated from Tn−T0, where T0 is the MFT in the 0th month and Tn is the MFT in the nth month. Assuming that the film formation property is lost at time n when ΔMFT≥4° C. is satisfied, the time at which ΔMFT≥4° C. is satisfied for the first time is taken to be the limit (film formation life) of the film formation property after long-term storage.

For example, in the case where the MFT in the 0th month is 12° C., the MFT in the 1st month is 13° C., and the MFT in the 2nd month is 16° C., the film formation life of the water dispersion is 2 months.

After this film formation life, a uniform coating film cannot be obtained, and the coating film cannot exhibit sufficient water vapor barrier property.

Given that it is difficult to distribute and store a water dispersion having a short film formation life, a longer film formation life is more desirable. Typically, when distributing and storing a water dispersion, its film formation life is preferably 3 months or more, more preferably 4 months or more, further preferably 5 months or more, and still further preferably 7 months or more.

EXAMPLES

More detailed description will be given below by way of examples.

In the description of Examples (Ex.) and Comparative Examples (Comp. Ex.), "parts" and "%" respectively denote parts by mass and mass %.

Example of Polymerization of Water Dispersion

Example 1

57 parts of pure water, 0.03 parts of sodium D-alaboascorbate, and 0.2 parts of sodium alkyl sulfonate with respect to 100 parts of the total mass of the monomers were charged in a glass-lined pressure-resistant reactor, and degassing was performed while stirring. After this, the temperature of the contents was maintained at 45° C. A raw material monomer mixture having a mass composition ratio of VDC/MAN/MMA/AA=91.5/5.2/2.4/0.9 was prepared in another container. 20 parts of the raw material monomer mixture were added all at once into the pressure-resistant reactor, and polymerized until the internal pressure dropped. The remaining 80 parts of the monomer mixture were then continuously quantified and injected.

Concurrently, an initiator obtained by dissolving 0.04 parts of t-butyl hydroperoxide in 3.5 parts of pure water, a reducer obtained by dissolving 0.015 parts of sodium D-alaboascorbate in 3.5 parts of pure water, and an emulsifier obtained by dissolving 1.6 parts of sodium alkyldiphenyl ether disulfonate in 2.5 parts of pure water were continuously quantified and injected. During this, the contents were kept at 45° C. while stirring, and the reaction was allowed to progress until the internal pressure dropped sufficiently.

The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

In the polymerization, it took 21 hr to continuously inject 80 parts of the monomer mixture and charge the whole amount.

Comparative Example 1

A water dispersion of a vinylidene chloride copolymer was produced in the same way as in Example 1 in PTL 4.

57 parts of pure water, 0.03 parts of sodium D-alaboascorbate, and 0.2 parts of sodium alkyl sulfonate with respect to 100 parts of the total mass of the monomers were charged in a glass-lined pressure-resistant reactor, and degassing was performed while stirring. After this, the temperature of the contents was maintained at 45° C. A raw material monomer mixture having a mass composition ratio of VDC/MMA/AN=90.1/9.4/0.5 was prepared in another container. 20 parts of the raw material monomer mixture were added all at once into the pressure-resistant reactor, and polymerized until the internal pressure dropped. The remaining 80 parts of the monomer mixture were then continuously quantified and injected.

Concurrently, an initiator obtained by dissolving 0.014 parts of t-butyl hydroperoxide in 3.5 parts of pure water, a reducer obtained by dissolving 0.015 parts of sodium D-alaboascorbate in 3.5 parts of pure water, and an emulsifier obtained by dissolving 1.6 parts of sodium alkyldiphenyl ether disulfonate in 2.5 parts of pure water were continuously quantified and injected. During this, the contents were kept at 45° C. while stirring, and the reaction was allowed to progress until the internal pressure dropped sufficiently.

The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

In the polymerization, it took 21 hr to continuously inject 80 parts of the monomer mixture and charge the whole amount.

Comparative Example 2

A water dispersion of a vinylidene chloride copolymer was produced in the same way as in Example 4 in PTL 4.

Polymerization was performed in the same way as in Comparative Example 1, except that the mass composition ratio of the raw material monomer mixture was VDC/MMA/MAN/AA=92.0/6.5/1.0/0.5.

The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

Comparative Example 3

A water dispersion of a vinylidene chloride copolymer was produced in the same way as in Comparative Example 1 in PTL 4.

Polymerization was performed in the same way as in Comparative Example 1, except that the mass composition ratio of the raw material monomer mixture was VDC/MAN/MMA/AA=91.5/5.2/2.4/0.9.

The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

Comparative Example 4

A water dispersion of a vinylidene chloride copolymer was produced in the same way as in Example 7 in PTL 1.

100 parts of ion-exchange water, 0.2 parts of sodium dodecyl sulfonate, and 0.2 parts of sodium persulfate were charged in a glass-lined pressure-resistant reactor, and degassing was performed. After this, the temperature of the contents was maintained at 50° C. 92.2 parts by mass of vinylidene chloride (VDC), 7.5 parts by mass of methyl acrylate (MA), and 0.3 parts by mass of acrylic acid (AA) were measured and mixed to prepare a monomer mixture in another container. 10 parts by mass of the monomer mixture were added into the reactor to cause reaction for about 10 hr, and then the remaining 90 parts by mass of the monomer mixture and 0.7 parts by mass of sodium dodecyl sulfonate were wholly added while making adjustment so that the addition would take about 23 hr to prevent an increase in internal temperature. Subsequently, the reaction was allowed to progress until the internal pressure dropped to 0.1 MPa, and then the mixture was heated to 60° C. and the residual monomers were removed under reduced pressure to obtain a water dispersion.

Comparative Example 5

A water dispersion of a vinylidene chloride copolymer was produced in the same way as in Example 11 in PTL 1.

100 parts of ion-exchange water, 0.2 parts of sodium dodecyl sulfonate, and 0.2 parts of sodium persulfate were charged in a glass-lined pressure-resistant reactor, and degassing was performed. After this, the temperature of the contents was maintained at 50° C. 91.5 parts by mass of vinylidene chloride (VDC), 8.2 parts by mass of methyl acrylate (MA), and 0.3 parts by mass of acrylic acid (AA) were measured and mixed to prepare a monomer mixture in another container. 10 parts by mass of the monomer mixture were added into the reactor to cause reaction for about 10 hr, and then the remaining 90 parts by mass of the monomer mixture and 0.7 parts by mass of sodium dodecyl sulfonate were wholly added while making adjustment so that the addition would take about 22 hr to prevent an increase in internal temperature. Subsequently, the reaction was allowed to progress until the internal pressure dropped to 0.1 MPa, and then the mixture was heated to 60° C. and the residual monomers were removed under reduced pressure to obtain a water dispersion. 0.3 parts by mass of a polyethylene wax composition (produced by BASF SE, Poligen® WE7 (Poligen is a registered trademark in Japan, other countries, or both)) were added to the water dispersion with respect to 100 parts by mass of the vinylidene chloride copolymer in the water dispersion, to obtain a water dispersion.

Comparative Example 6

A water dispersion of a vinylidene chloride copolymer was produced in the same way as in Comparative Example 3 in PTL 5.

86 parts by mass of water, 0.15 parts by mass of sodium alkyl sulfonate (Bayer AG, Walorate U), and 0.10 parts by mass of sodium persulfate were charged in a glass-lined pressure-resistant reactor, and degassing was performed. After this, the temperature of the contents was maintained at 55° C. 89 parts by mass of vinylidene chloride, 3 parts by mass of methacrylonitrile, and 8 parts by mass of methyl methacrylate were measured and mixed to prepare a monomer mixture in another container. 10 parts by mass of the monomer mixture were charged in the reactor, and the reaction was allowed to progress while stirring. After confirming that the reaction had mostly progressed from the result that the internal pressure of the reactor had dropped, 10 parts by mass of sodium alkyl sulfonate of a 15 mass % water solution were injected, and then all of the remaining monomer mixture was continuously quantified and added over a period of 15 hr. The reaction was further allowed to progress until the internal pressure dropped sufficiently. Sodium alkyl sulfonate of a 15 mass % water solution was added to the resultant water dispersion so that the gas-liquid interfacial tension at 20 degrees would be 42 mN/m.

Example 2

Polymerization was performed in the same way as in Example 1 except that the initiator used was 0.08 parts of t-butyl hydroperoxide dissolved in 3.5 parts of pure water instead of 0.04 parts of t-butyl hydroperoxide dissolved in 3.5 parts of pure water. The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

Example 3

Polymerization was performed in the same way as in Comparative Example 3 except that 80 parts of the monomer mixture were continuously injected and the time taken to charge the whole amount was 45 hr. The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

Example 4

Polymerization was performed in the same way as in Example 1 except that the mass composition ratio of the raw material monomer mixture was VDC/MMA/MAN=89/8/3. The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

Example 5

Polymerization was performed in the same way as in Example 4. A polyethylene wax composition (produced by BASF SE, Poligen® WE7) was added to the produced water dispersion so that the dry mass would be 1.0 part by mass with respect to 100 parts by mass of the vinylidene chloride copolymer.

Example 6

A water dispersion of a vinylidene chloride copolymer (crystal nucleating agent) polymerized by the same method as in Comparative Example 1 except that the mass composition ratio of the raw material monomer mixture was VDC/AN=98/2 was added so that the dry mass would be 1.0 part by mass with respect to 100 parts by mass of the vinylidene chloride copolymer produced in Example 4.

The vinylidene chloride copolymer added as the crystal nucleating agent had only a melting peak of 170° C. or more, and S1/(S1+S2) was 1.0.

The maximum melting peak of the added vinylidene chloride copolymer was 175° C.

Example 7

Polymerization was performed in the same way as in Example 1 except that the mass composition ratio of the raw material monomer mixture was VDC/MAN=85/15. The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

Example 8

Polymerization was performed in the same way as in Example 1 except that the mass composition ratio of the raw material monomer mixture was VDC/MAN=80/20. The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

Example 9

Polymerization was performed in the same way as in Example 7. A montanoic acid wax composition (produced by Saiden Chemical Industry Co., Ltd., T-350A) was added to the produced water dispersion so that the dry mass would be 1.0 part by mass with respect to 100 parts by mass of the vinylidene chloride copolymer.

Example 10

Polymerization was performed in the same way as in Example 8. A carnauba wax composition (produced by Michelman, Inc., ML160 RPH) was added to the produced water dispersion so that the dry mass would be 1.0 part by mass with respect to 100 parts by mass of the vinylidene chloride copolymer.

Example 11

A water dispersion was produced in the same way as in Example 6 except that the amount of the water dispersion of the vinylidene chloride copolymer added as the crystal nucleating agent was set so that the dry mass would be 5.0 parts by mass.

Example 12

A water dispersion was produced in the same way as in Example 6 except that the amount of the water dispersion of the vinylidene chloride copolymer added as the crystal nucleating agent was set so that the dry mass would be 10.0 parts by mass.

Example 13

A water dispersion was produced in the same way as in Example 6 except that the amount of the water dispersion of the vinylidene chloride copolymer added as the crystal nucleating agent was set so that the dry mass would be 20.0 parts by mass.

Comparative Example 7

A water dispersion was produced in the same way as in Example 6 except that the amount of the water dispersion of the vinylidene chloride copolymer added as the crystal nucleating agent was set so that the dry mass would be 30.0 parts by mass.

Example 14

Polymerization was performed in the same way as in Example 1 except that the mass composition ratio of the raw material monomer mixture was VDC/AN/MMA=90/1.5/8.5. The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

Example 15

Polymerization was performed in the same way as in Example 1 except that the mass composition ratio of the raw material monomer mixture was VDC/MAN/MMA=86/5/9. The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

Example 16

Polymerization was performed in the same way as in Example 1 except that the mass composition ratio of the raw material monomer mixture was VDC/MAN/MA=90/1/9. The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

Example 17

Polymerization was performed in the same way as in Example 1 except that the mass composition ratio of the raw material monomer mixture was VDC/MAN/MA=90/3/7. The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

Example 18

Polymerization was performed in the same way as in Example 1 except that the mass composition ratio of the raw material monomer mixture was VDC/MAN/MA=90/5/5. The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

Example 19

Polymerization was performed in the same way as in Example 1 except that the mass composition ratio of the raw material monomer mixture was VDC/MMA=90/10. The polymerization yield was 99.9%. Since the polymerization yield was nearly 100%, the composition of the copolymer was substantially equal to the raw material charging ratio. The unreacted monomers were removed from the water dispersion obtained in this way by steam stripping, and then the solid content was adjusted to 50% to 60%.

The following evaluation was conducted using each of the obtained water dispersions of vinylidene chloride copolymers. The results are shown in Table 1.

<Coating Film Production>

Emulder 381A produced by BASF SE was applied as a primer onto a stretched polyvinyl chloride film (250 μm in thickness) that had undergone corona discharge treatment using a Mayer rod so that the coating film mass after drying would be 2 $g/m^2$, and the resultant film was subjected to drying treatment at 85° C. for 15 sec in a hot air circulation dryer. The water dispersion of the vinylidene chloride copolymer obtained in each of Examples and Comparative Examples was applied onto this film using a Mayer rod so that the coating film mass after drying in one coating operation would be 10 $g/m^2$, and the resultant film was subjected to drying treatment at 85° C. for 15 sec in a hot air circulation dryer. The water dispersion of the vinylidene chloride copolymer was repeatedly applied until the coating film mass after drying reached 40 $g/m^2$. The obtained coating film was placed in an oven at 40° C. and stored for 24 hr, and then the humidity was adjusted for 2 hr in a constant temperature and humidity chamber at 20° C. with a humidity of 55%.

<Measurement of Water Vapor Permeability (Water Vapor Transmission Ratio)>

For each of the obtained coating films, the water vapor permeability was measured under the conditions of 38° C. and 100% RH using water vapor permeability measurement device PERMATRAN 3/33 produced by MOCON, Inc. (unit: $g/m^2$/day at 38° C. and 100% RH).

The average value of the measurement values from 48 hr to 60 hr after the start of measurement was taken to be the water vapor permeability.

The measurement was performed four times, and the average value was used.

<Measurement of Maximum Melting Peak Temperature>

The water dispersion of the vinyl halide copolymer was applied onto an aluminum plate with a Mayer bar so as to be 10 $g/m^2$ in dry coating amount, and dried in an oven maintained at 100° C. The dried film was peeled off with tweezers within 5 min, to collect a single film of the vinyl halide copolymer. 5 mg was collected from the single film. In the case where an additive such as a crystal nucleating agent was added to the water dispersion, sample preparation and measurement were performed using the water dispersion having the additive added thereto.

The sample collected by this method was heated to 170° C. at 10° C./min in a nitrogen atmosphere using differential scanning calorimeter Q-2000 produced by TA Instruments, Inc., and cooled to −40° C. at 10° C./min.

The sample was then heated to 190° C. at 10° C./min, and measurement data up to 190° C. was acquired. Of the acquired measurement data up to 190° C., data at 180° C. or more was not used because decomposition of vinylidene chloride starts at 180° C. or more, and measurement values from −40° C. to 180° C. during the second heating were used to determine the maximum melting peak temperature.

In this measurement, Tzero Pan and Tzero Hermetic Lid (produced by TA Instruments, Inc.) of aluminum were used as a sample pan, and an empty pan of this pan was used as a reference.

Next, a baseline was drawn by one of the foregoing methods, and the area of the melting peak at less than 170° C. was calculated using Integrate Peak Linear in analysis tool TA Universal Analysis of Q-2000 and taken to be S2. If there was no melting peak at less than 170° C., S2 was set to 0.

A baseline was drawn, and the area of the melting peak at 170° C. or more was calculated using Integrate Peak Linear in analysis tool TA Universal Analysis of Q-2000 and taken to be S1. If there was no melting peak at 170° C. or more, S1 was set to 0.

The obtained values of S1 and S2 were rounded to one decimal place.

<Test of Film Formation Property after Long-Term Storage>

In a constant temperature and humidity chamber with a temperature of 23° C. and a humidity of 55%, 45 ml of the water dispersion was collected in a 50 ml sample bottle, which was then covered with the lid and left for 5 hr. Following this, in the constant temperature and humidity chamber, the temperature of a heat gradient tester (BIG HEART) produced by Imoto Machinery Co., Ltd. was adjusted so that one end would be 10° C. and the other end would be 30° C. After making sure that the heat gradient on the tester was 1° C. per 4 cm, the water dispersion was applied onto the tester with a 0.2 mm applicator and dried for 12 hr. The maximum temperature at which cracks having a diameter of 1 mm or more occurred in the coating film was taken to be the minimum film formation temperature (MFT). The MFT was measured ten times for one sample, and the average value was used.

The water dispersion obtained in each of Examples and Comparative Examples was stored at 23° C., and the MFT was measured every month. MFT change ΔMFT was calculated from Tn−T0, where TO is the MFT in the 0th month and Tn is the MFT in the nth month. Assuming that the film formation property was lost at time n when ΔMFT≥4° C. was satisfied, the time at which ΔMFT≥4° C. was satisfied for the first time was taken to be the limit (film formation life) of the film formation property after long-term storage.

For example, in the case where the MFT in the 0th month is 12° C., the MFT in the 1st month is 13° C., and the MFT in the 2nd month is 16° C., the film formation life of the water dispersion is 2 months.

<Monomer Composition>

The monomer composition of the vinyl halide copolymer in each of Examples and Comparative Examples was evaluated by dissolving a sample collected by the below-described method in tetrahydrofuran-d8 and performing NMR measurement.

10 ml of the water dispersion was freeze-dried, and 0.5 g of the freeze-dried product was collected. 40 ml of methanol was added dropwise to a solution prepared by dissolving the collected freeze-dried product in 10 ml of tetrahydrofuran having a purity of 99.9 wt % or more. The resultant precipitate was filtered to collect the remaining insoluble component. The collected insoluble component was used as a measurement sample.

The NMR measurement conditions are as follows:

Device: JEOL RESONANCE ECS 400 (1H), Bruker Biospin Avance 600 (13C).

Observation nucleus: 1H (399.78 MHz), 13C (150.91 MHz).

Pulse program: Single pulse (1H), zgig30 (13C).

Total number of times: 256 times (1H), 10000 times (13C).

Lock solvent: THF-d8.

Chemical shift standard: THF (1H: 180 ppm, 13C: 67.38 ppm).

Using the obtained NMR spectrum, the peak was integrated to identify the composition in the copolymer. The types of the monomers contained are obvious from the charged monomers.

For example, in the case of a polymer containing respective structural units derived from vinylidene chloride, methacrylonitrile, methyl methacrylate, and acrylic acid, in a spectrum of 13C-NMR, 80 ppm to 90 ppm were integrated to determine the content of the structural unit derived from vinylidene chloride, 110 ppm to 130 ppm were integrated to determine the content of the structural unit derived from methacrylonitrile, 170 ppm to 180 ppm were integrated to determine the content of the structural unit derived from methyl methacrylate, and 180 ppm to 200 ppm were integrated to determine the content of the structural unit derived from acrylic acid. The component ratio of each monomer to the whole polymer was then calculated.

In the case of a copolymer containing a structural unit derived from methyl acrylate instead of methyl methacrylate, calculation was performed by replacing methyl methacrylate in the foregoing calculation method with methyl acrylate.

In the case of a copolymer containing a structural unit derived from acrylonitrile instead of methacrylonitrile, calculation was performed by replacing methacrylonitrile in the foregoing calculation method with acrylonitrile.

The measurement results revealed that the polymer obtained in each of Examples and Comparative Examples had the same monomer composition as the charged composition.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Vinylidene chloride | part by mass | 91.5 | 91.5 | 91.5 | 89 | 89 | 89 | 85 | 80 | 85 | 80 |
| Methacrylonitrile | part by mass | 5.2 | 5.2 | 5.2 | 3 | 3 | 3 | 15 | 20 | 15 | 20 |
| Acrylonitrile | part by mass | — | — | — | — | — | — | — | — | — | — |
| Methyl methacrylate | part by mass | 2.4 | 2.4 | 2.4 | 8 | 8 | 8 | — | — | — | — |
| Acrylic acid | part by mass | 0.9 | 0.9 | 0.9 | — | — | — | — | — | — | — |
| Methyl acrylate | part by mass | — | — | — | — | — | — | — | — | — | — |
| Mass ratio of copolymerization monomer with r1 of less than 0.7 | part by mass | 8.5 | 8.5 | 8.5 | 11 | 11 | 11 | 15 | 20 | 15 | 20 |
| Wax | part by mass | — | — | — | — | 1 | — | — | — | 1 | 1 |
| Vinyl halide copolymer particles with maximum melting peak temperature of 160° C. or more | part by mass | — | — | — | — | — | 1 | — | — | — | — |
| Maximum melting point | ° C. | 155 | 154 | 155 | 150 | 150 | 175 | 140 | 130 | 140 | 130 |
| Melting peak area S1 of 170° C. or more | J/g | 2.6 | 1.9 | 0.0 | 0.0 | 0.4 | 0.4 | 0.0 | 0.0 | 0.0 | 0.1 |
| Melting peak area S2 of less than 170° C. | J/g | 6.3 | 5.7 | 16.6 | 16.9 | 7.7 | 7.8 | 10.0 | 8.8 | 6.3 | 4.5 |
| S1/(S1 + S2) | — | 0.29 | 0.25 | 0.00 | 0.00 | 0.05 | 0.05 | 0.00 | 0.00 | 0.00 | 0.02 |
| Water vapor permeability | $g/m^2$/day | 0.35 | 0.35 | 0.35 | 0.41 | 0.38 | 0.38 | 0.45 | 0.5 | 0.39 | 0.4 |
| Film formation life | month | 3 | 4 | 5 | 7 | 7 | 7 | 8 | 12 | 8 | 12 |

| | | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Vinylidene chloride | part by mass | 89 | 89 | 89 | 90 | 86 | 90 | 90 | 90 |
| Methacrylonitrile | part by mass | 3 | 3 | 3 | — | 5 | 1 | 3 | 5 |
| Acrylonitrile | part by mass | — | — | — | 1.5 | — | — | — | — |
| Methyl methacrylate | part by mass | 8 | 8 | 8 | 8.5 | 9 | — | — | — |
| Acrylic acid | part by mass | — | — | — | — | — | — | — | — |
| Methyl acrylate | part by mass | — | — | — | — | — | 9 | 7 | 5 |

TABLE 1-continued

| | | | | | | | | | |
|---|---|---|---|---|---|---|---|---|---|
| Mass ratio of copolymerization monomer with r1 of less than 0.7 | part by mass | 11 | 11 | 11 | 10 | 14 | 1 | 3 | 5 |
| Wax | part by mass | — | — | — | — | — | — | — | — |
| Vinyl halide copolymer particles with maximum melting peak temperature of 160° C. or more | part by mass | 5 | 10 | 20 | — | — | — | — | — |
| Maximum melting point | ° C. | 175 | 175 | 175 | 145 | 141 | 145 | 146 | 144 |
| Melting peak area S1 of 170° C. or more | J/g | 0.3 | 0.5 | 1.0 | 0.2 | 0.0 | 0.3 | 0.2 | 0.3 |
| Melting peak area S2 of less than 170° C. | J/g | 7.9 | 8.0 | 6.3 | 7.9 | 9.0 | 7.7 | 8.0 | 7.8 |
| S1/(S1 + S2) | — | 0.04 | 0.06 | 0.14 | 0.02 | 0.00 | 0.04 | 0.02 | 0.04 |
| Water vapor permeability | $g/m^2/day$ | 0.39 | 0.4 | 0.5 | 0.43 | 0.42 | 0.55 | 0.5 | 0.45 |
| Film formation life | month | 7 | 7 | 7 | 6 | 7 | 6 | 6 | 6 |

| | | Ex. 19 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Vinylidene chloride | part by mass | 90 | 90.1 | 92 | 91.5 | 92.2 | 91.5 | 89 | 89 |
| Methacrylonitrile | part by mass | — | — | 1 | 5.2 | — | — | 3 | 3 |
| Acrylonitrile | part by mass | — | 0.5 | — | — | — | — | — | — |
| Methyl methacrylate | part by mass | 10 | 9.4 | 6.5 | 2.4 | — | — | 8 | 8 |
| Acrylic acid | part by mass | — | — | 0.5 | 0.9 | 0.3 | 0.3 | — | — |
| Methyl acrylate | part by mass | — | — | — | — | 7.5 | 8.2 | — | — |
| Mass ratio of copolymerization monomer with r1 of less than 0.7 | part by mass | 10 | 9.9 | 8 | 8.5 | 0.3 | 0.3 | 11 | 11 |
| Wax | part by mass | — | — | — | — | — | 0.3 | — | — |
| Vinyl halide copolymer particles with maximum melting peak temperature of 160° C. or more | part by mass | — | — | — | — | — | — | — | 30 |
| Maximum melting point | ° C. | 145 | 174 | 174 | 175 | 160 | 154 | 175 | 175 |
| Melting peak area S1 of 170° C. or more | J/g | 0.2 | 3.5 | 3.2 | 3.4 | 0.0 | 0.0 | 2.1 | 2.4 |
| Melting peak area S2 of less than 170° C. | J/g | 7.9 | 6.2 | 6.3 | 6.3 | 12.0 | 9.0 | 4.0 | 4.7 |
| S1/(S1 + S2) | — | 0.02 | 0.36 | 0.34 | 0.35 | 0.00 | 0.00 | 0.34 | 0.34 |
| Water vapor permeability | $g/m^2/day$ | 0.47 | 0.65 | 0.33 | 0.35 | 0.64 | 0.68 | 0.4 | 0.61 |
| Film formation life | month | 6 | 1 | 1 | 1 | 12 | 12 | 1 | 7 |

The experimental results of each of Examples and Comparative Examples are shown in Table 1.

The results shown in Table 1 demonstrated that each of the water dispersions of vinyl halide copolymers according to the present disclosure had excellent film formation property after long-term storage while maintaining high water vapor barrier property of a film after coating.

INDUSTRIAL APPLICABILITY

A water dispersion of a vinyl halide copolymer according to the present disclosure has excellent water vapor barrier property of a film after coating and excellent film formation property after long-term storage, and is suitable for use as coating for various materials such as food and pharmaceutical packaging films, paper, and general household products.

The invention claimed is:

1. A laminated film consisting of:

a substrate film, wherein the substrate film is selected from the group consisting of polyvinyl chloride, polyester, and polypropylene; and one or a plurality of layers formed on the substrate film from a water dispersion of a vinyl halide copolymer, or one or a plurality of layers formed on the substrate film from a water dispersion of a vinyl halide copolymer and an additional layer interposed between said one or a plurality of layers formed from the water dispersion of a vinyl halide copolymer and said substrate film, the water dispersion comprising:

a vinyl halide copolymer containing a structural unit derived from a vinyl halide monomer and a structural unit derived from a copolymerization monomer whose reactivity ratio r1 to vinylidene chloride is less than 0.7, wherein the copolymerization monomer whose reactivity ratio r1 is less than 0.7 comprises 1 part by mass or more of methacrylonitrile with respect to 100 parts by mass in total of the structural unit derived from the vinyl halide monomer, the structural unit derived from the copolymerization monomer whose reactivity ratio r1 is less than 0.7, and a structural unit derived from a copolymerization monomer whose reactivity ratio r1 to vinylidene chloride is 0.7 or more, wherein S1/(S1+S2) is 0 or more and 0.33 or less, where S1 is an area of a melting peak having a melting peak temperature of 170° C. or more, and S2 is an area of a melting peak having a melting peak temperature less than 170° C., and wherein one or a plurality of layers formed on the substrate film have a water vapor permeability of 0.55 $g/m^2/day$ or less.

2. The laminated film according to claim 1, wherein the vinyl halide monomer is vinylidene chloride.

3. The laminated film according to claim 1, wherein the copolymerization monomer whose reactivity ratio r1 is less than 0.7 further comprises a carboxyl group-containing monomer or methyl methacrylate.

4. The laminated film according to claim 3, wherein the carboxyl group-containing monomer is acrylic acid, itaconic acid, maleic acid, or methacrylic acid.

5. The laminated film according to claim 1, wherein the mass ratio of the structural unit derived from the copolymerization monomer whose reactivity ratio r1 is less than 0.7 is 5 parts by mass or more and 20 parts by mass or less.

6. The laminated film according to claim 1, wherein a mass ratio of the structural unit derived from the vinyl halide monomer is 86 parts by mass or more with respect to 100 parts by mass in total of the structural unit derived from the vinyl halide monomer, the structural unit derived from the copolymerization monomer whose reactivity ratio r1 is less than 0.7, and the structural unit derived from the copolymerization monomer whose reactivity ratio r1 is 0.7 or more, and the mass ratio of the structural unit derived from the copolymerization monomer whose reactivity ratio r1 is less than 0.7 is 14 parts by mass or less.

7. The laminated film according to claim 1, wherein the water dispersion further comprises a crystal nucleating agent in an amount of 20 parts by mass or less with respect to 100 parts by mass of the vinyl halide copolymer.

8. The laminated film according to claim 1, wherein the water dispersion further comprises a polymerization activator.

9. The laminated film according to claim 1, wherein the water dispersion further comprises a structural unit derived from a copolymerization monomer whose reactivity ratio r1 to the vinyl halide monomer is 0.7 or more.

* * * * *